(12) United States Patent
Kato

(10) Patent No.: US 11,305,629 B2
(45) Date of Patent: Apr. 19, 2022

(54) VEHICLE

(71) Applicant: SUBARU CORPORATION, Tokyo (JP)

(72) Inventor: Wataru Kato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 361 days.

(21) Appl. No.: 16/440,006

(22) Filed: Jun. 13, 2019

(65) Prior Publication Data
US 2020/0101829 A1 Apr. 2, 2020

(30) Foreign Application Priority Data
Sep. 27, 2018 (JP) .............................. JP2018-182404

(51) Int. Cl.
| | | |
|---|---|---|
| *B60K 3/04* | (2006.01) | |
| *B60K 13/04* | (2006.01) | |
| *F01N 13/16* | (2010.01) | |
| *B62D 21/15* | (2006.01) | |
| *B62D 21/00* | (2006.01) | |

(52) U.S. Cl.
CPC ............... *B60K 3/04* (2013.01); *B60K 13/04* (2013.01); *B62D 21/00* (2013.01); *B62D 21/157* (2013.01); *F01N 13/16* (2013.01)

(58) Field of Classification Search
CPC .......... B60K 3/04; B60K 13/04; B62D 21/00; B62D 21/157; F01N 13/16
See application file for complete search history.

(56) References Cited

U.S. PATENT DOCUMENTS

| | | | | |
|---|---|---|---|---|
| 2,994,394 | A | * | 8/1961 | Underwood ............... F02C 6/20 180/301 |
| 3,027,717 | A | * | 4/1962 | Conklin .................... F02C 3/08 60/757 |
| 3,853,194 | A | * | 12/1974 | Peterson ................. F01K 15/02 180/7.3 |
| 7,698,890 | B1 | * | 4/2010 | Cecchini, III ............ F02C 1/02 60/409 |
| 2010/0116578 | A1 | * | 5/2010 | Mustafa .................. F02B 33/32 180/165 |
| 2019/0107032 | A1 | * | 4/2019 | Utsunomiya ........... F01N 3/005 |
| 2020/0101829 | A1 | * | 4/2020 | Kato ........................ B60K 3/04 |

FOREIGN PATENT DOCUMENTS

| | | | | |
|---|---|---|---|---|
| EP | 2226481 | A1 * | 9/2010 | ............. C23C 26/00 |
| JP | 2008095527 | A * | 4/2008 | |
| JP | 2008190371 | A * | 8/2008 | |
| JP | 2015182628 | | 3/2014 | |
| JP | 2015523490 | A * | 8/2015 | |

* cited by examiner

*Primary Examiner* — Jacob B Meyer
(74) *Attorney, Agent, or Firm* — Chip Law Group

(57) ABSTRACT

A vehicle includes a turbine engine. The turbine engine is mounted on a frame member on a front side of the vehicle and has a turbine engine body and an exhaust pipe coupled to a rear side of the turbine engine body in a front-rear direction of the vehicle. A fragile part configured to be crushed more easily than another part of the exhaust pipe is formed in the exhaust pipe on the turbine engine body side.

18 Claims, 9 Drawing Sheets

VEHICLE

CROSS REFERENCE TO RELATED APPLICATIONS

This application claims the benefit of Japanese Priority Patent Application JP 2018-182404 filed Sep. 27, 2018, the entire contents of which are incorporated herein by reference.

BACKGROUND

The disclosure relates to a vehicle.

Technologies for applying turbine engines that can be reduced in size and weight more easily than reciprocating engines as internal combustion engines to be installed in vehicles have been proposed recently for the purpose of reducing the spaces occupied by the internal combustion engines inside vehicles and improving fuel efficiency. Japanese Unexamined Patent Application Publication No. 2015-182628, for example, discloses a technology for applying a turbine engine that serves as an internal combustion engine for driving a generator that generates electric power to be accumulated in a battery to an electric vehicle.

SUMMARY

An aspect of the disclosure provides a vehicle including a turbine engine. The turbine engine is mounted on a frame member on a front side of the vehicle and has a turbine engine body and an exhaust pipe coupled to a rear side of the turbine engine body in a front-rear direction of the vehicle. A fragile part configured to be crushed more easily than another part of the exhaust pipe is formed in the exhaust pipe on the turbine engine body side.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
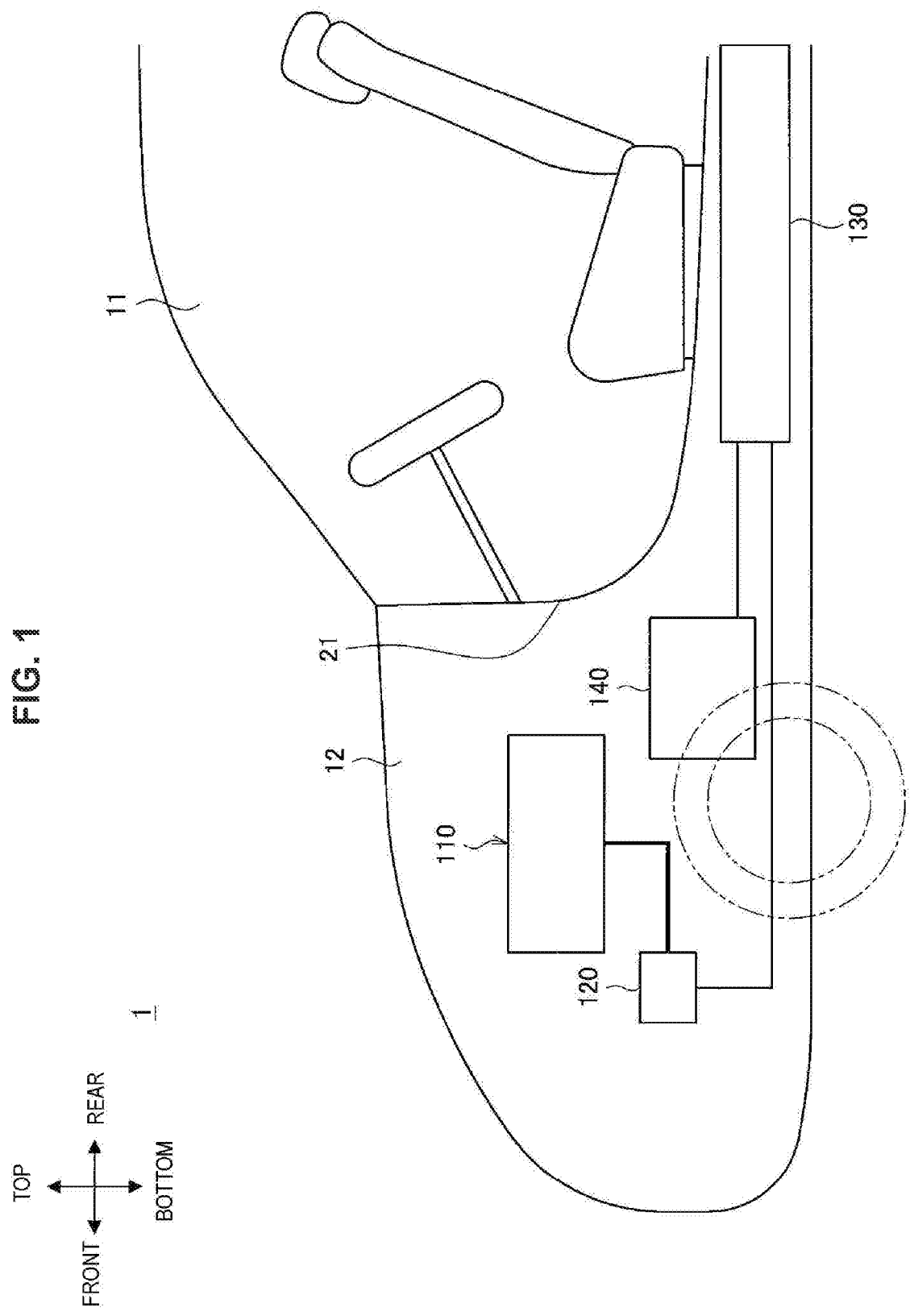
FIG. 1 is a schematic view illustrating an overall configuration of a vehicle according to a first embodiment of the disclosure.

In the following, some embodiments of the disclosure are described in detail with reference to the accompanying drawings. Note that sizes, materials, specific values, and any other factors illustrated in respective embodiments are illustrative for easier understanding of the disclosure, and are not intended to limit the scope of the disclosure unless otherwise specifically stated. Further, elements in the following example embodiments which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

Hereinafter, preferred implementations of the disclosure will be described in detail with reference to the appended drawings. Note that, in this specification and the appended drawings, structural elements that have substantially the same function and structure are denoted with the same reference numerals, and repeated description of these structural elements is omitted.

When a turbine engine is installed in a vehicle, the turbine engine is specifically mounted on a frame member at one side in the front-rear direction of the vehicle, and is disposed, for example, inside the engine room. Therefore, there is concern of the turbine engine being damaged at the time of a collision of the vehicle since a collision load is imposed on the turbine engine. Here, since the number of revolutions of the turbine engine is higher than that of reciprocating engines, for example, when the turbine engine is damaged at the time of a collision of the vehicle, there is concern of parts of the turbine engine scattering around at a high scattering speed.

Therefore, in order to prevent the turbine engine from being damaged at the time of a collision of a vehicle, measures such as setting the strength of the turbine engine to be higher, providing a protection mechanism that prevents a collision load from being imposed on the turbine engine (e.g., a mechanism having an extension member that preferentially receives a collision load, which will be described below) in the turbine engine, and the like have been considered. However, while such measures may make it difficult for the turbine engine to be crushed in the front-rear direction of the vehicle, on the other hand, the frame member having the function of absorbing the collision load imposed around the turbine engine is less likely to be crushed in the front-rear direction of the vehicle. Accordingly, the absorption amount of the collision load imposed on the vehicle at the time of the collision decreases. In particular, since the turbine engine is relatively long in its axial direction, when the turbine engine is disposed in the axial direction along the front-rear direction of the vehicle, for example, the frame member having the function of absorbing the collision load is less likely to be crushed in the front-rear direction of the vehicle due to the above-described measures.

Therefore, the disclosure has been conceived taking the above problems into consideration, and it is desirable to provide a novel and improved vehicle that can properly absorb a collision load at the time of a collision of the vehicle.

Further, in the present specification, the front-rear direction of the vehicle is the direction along the traveling direction of a vehicle, a top-bottom direction of the vehicle is the direction along the vertical direction, and a left-right direction of the vehicle is the direction orthogonal to the front-rear direction of the vehicle and the top-bottom direction of the vehicle. Specifically, the front side of the front-rear direction of the vehicle corresponds to the side in the traveling direction, and the rear side of the front-rear direction of the vehicle corresponds to the side opposite to the traveling direction. In addition, the upper side of the top-bottom direction of the vehicle corresponds to the vertically upper side, and the lower side of the top-bottom direction of the vehicle corresponds to the vertically lower side. In addition, the left side of the left-right direction of the vehicle corresponds to the left side of the vehicle when it faces in the traveling direction, and the right side of the left-right direction of the vehicle corresponds to the right side of the vehicle when it faces in the traveling direction.

1. First Embodiment

A vehicle 1 according to a first embodiment of the disclosure will be described with reference to FIG. 1 to FIG. 6.

[Configuration]

First a configuration of the vehicle 1 according to the first embodiment of the disclosure will be described with reference to FIG. 1 to FIG. 5.

FIG. 1 is a schematic view illustrating an overall configuration of the vehicle 1.

The vehicle 1 includes a turbine engine 110 as illustrated in FIG. 1. Furthermore, the vehicle 1 includes a generator 120, a battery 130, and a drive motor 140. Specifically, the vehicle 1 can travel using the drive motor 140 as a drive source. In addition, the vehicle 1 can extend the cruising distance by charging the battery 130 with electric power generated by the generator 120.

The turbine engine 110 is an internal combustion engine that generates rotational energy by driving a turbine to rotate using a high-temperature and high-pressure gas produced by combustion. The turbine engine 110 is mounted on a frame member on one side of the vehicle 1 in the front-rear direction of the vehicle. The turbine engine 110 has a turbine engine body and an exhaust pipe coupled to the rear side of the turbine engine body in the front-rear direction of the vehicle as will be described below.

In the first embodiment, in the turbine engine 110, a fragile part that is crushed more easily than other parts of the exhaust pipe is formed in the exhaust pipe on the turbine engine body side. Thus, a collision load imposed on the vehicle 1 at the time of a collision can be properly absorbed.

Specifically, the turbine engine 110 is mounted on the frame member on the front side of the vehicle 1 and is disposed inside an engine room 12 as will be described below. The engine room 12 corresponds to the space on the front side of a toe board 21 defining a cabin 11 in the inner space of the vehicle 1. Further, a configuration of the turbine engine 110 will be described below in more detail.

The generator 120 is driven by power output from the turbine engine 110 and generates electricity. For example, the generator 120 is coupled to the rotating shaft of the turbine engine 110 via a gear, a chain, or the like, and power output from the turbine engine 110 is transmitted to the generator 120 via the gear, the chain, or the like. Further, the generator 120 is disposed coaxially with the rotating shaft of the turbine engine 110 and may be directly coupled to the rotating shaft. The generator 120 is disposed, for example, inside the engine room 12.

The battery 130 is a chargeable and dischargeable secondary battery. As the battery 130, for example, a lithium-ion battery, a lithium-ion polymer battery, a nickel-mercury battery, a nickel-cadmium battery, or a lead storage battery may be used; however other batteries may be used. The battery 130 is coupled to the generator 120, and the battery 130 is charged when electric power generated by the generator 120 is supplied to the battery 130. The battery 130 is disposed, for example, below the cabin 11.

The drive motor 140 is a motor that can output power for driving the drive wheel of the vehicle 1. As the drive motor 140, for example, a polyphase AC (e.g., three-phase AC) motor may be used. The drive motor 140 is coupled to the battery 130 via an inverter, which is not illustrated, and generates power using electric power accumulated in the battery 130. The drive motor 140 is disposed, for example, inside the engine room 12.

A configuration of the inside of the engine room 12 will be described below in more detail with reference to FIG. 2 to FIG. 5.

Figure 2:
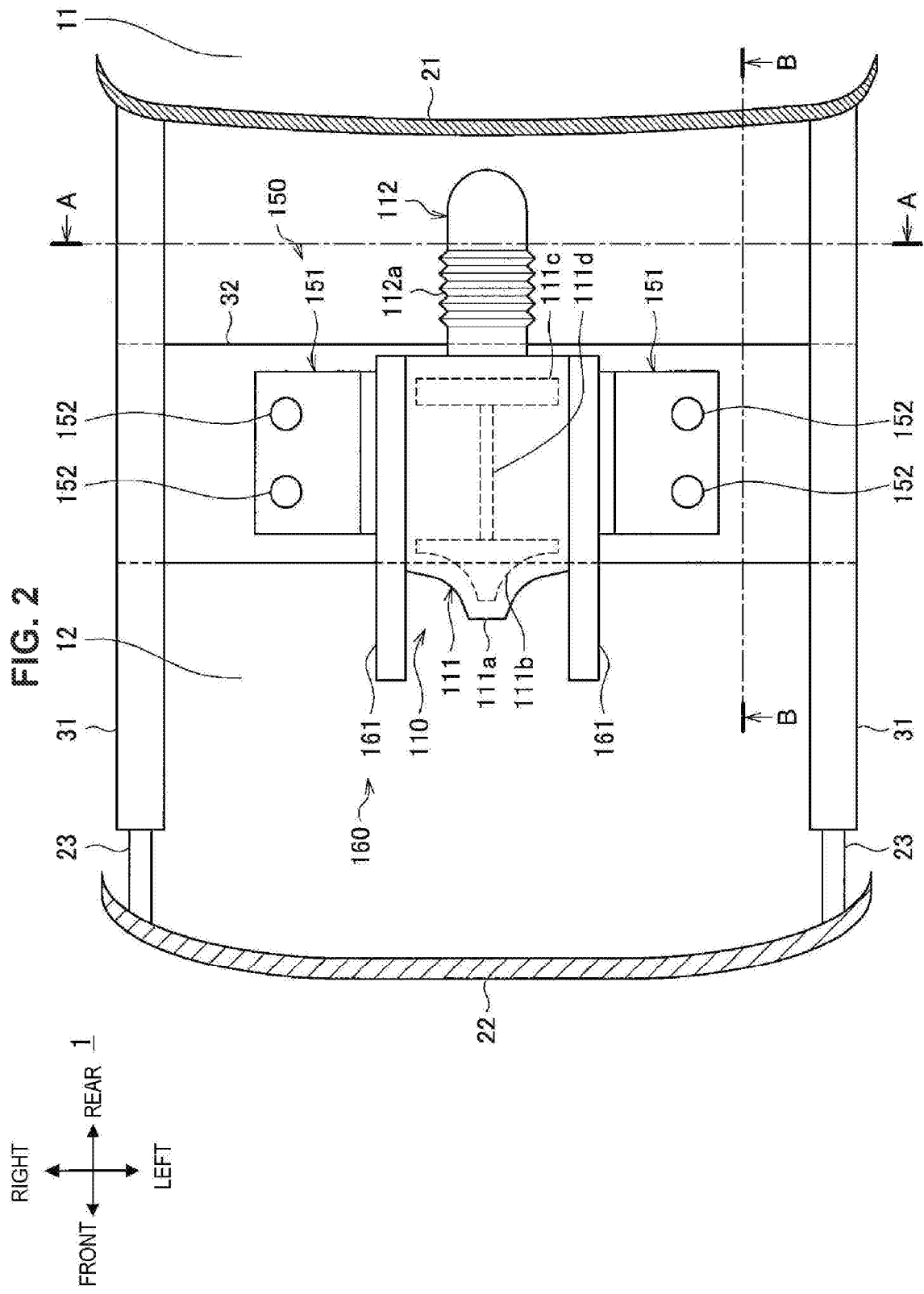
FIG. 2 is a schematic plan view illustrating an overall configuration of the inside of the engine room of the vehicle according to the first embodiment of the disclosure.
Figure 3:
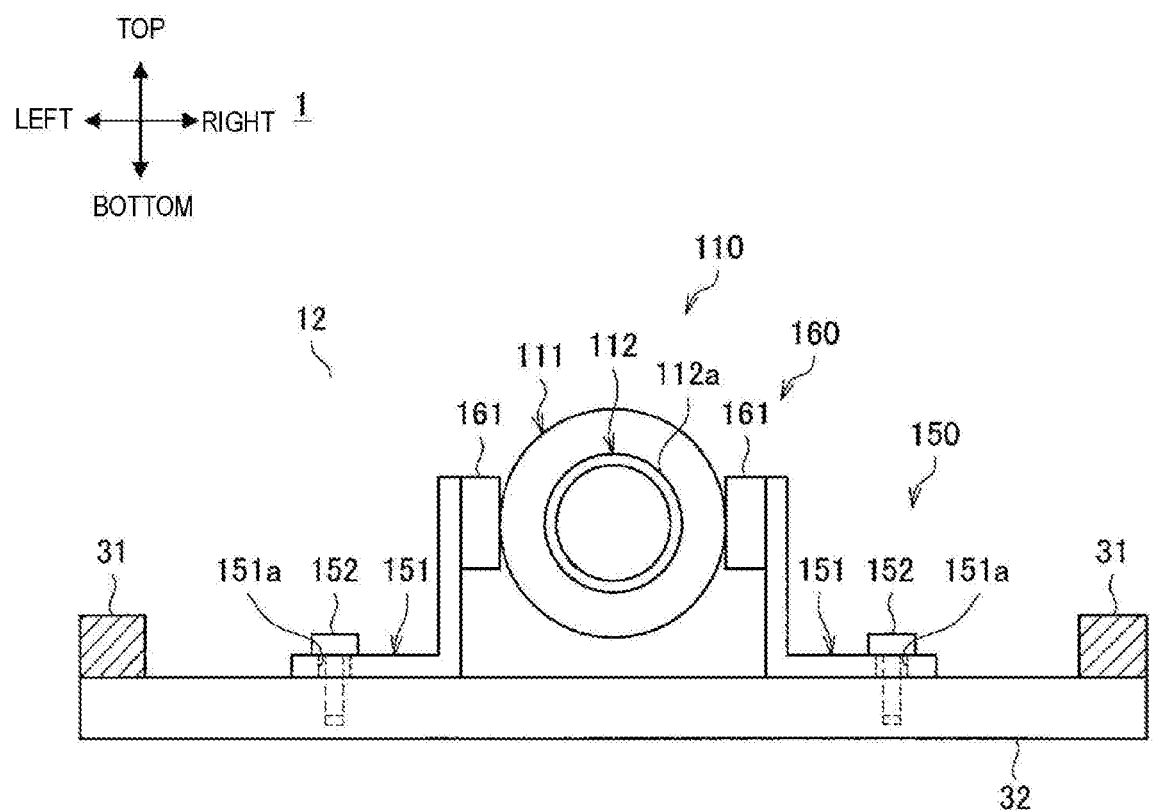
FIG. 3 is a schematic view from the back side of the turbine engine of the vehicle according to the first embodiment of the disclosure and members around the turbine engine.
Figure 4:
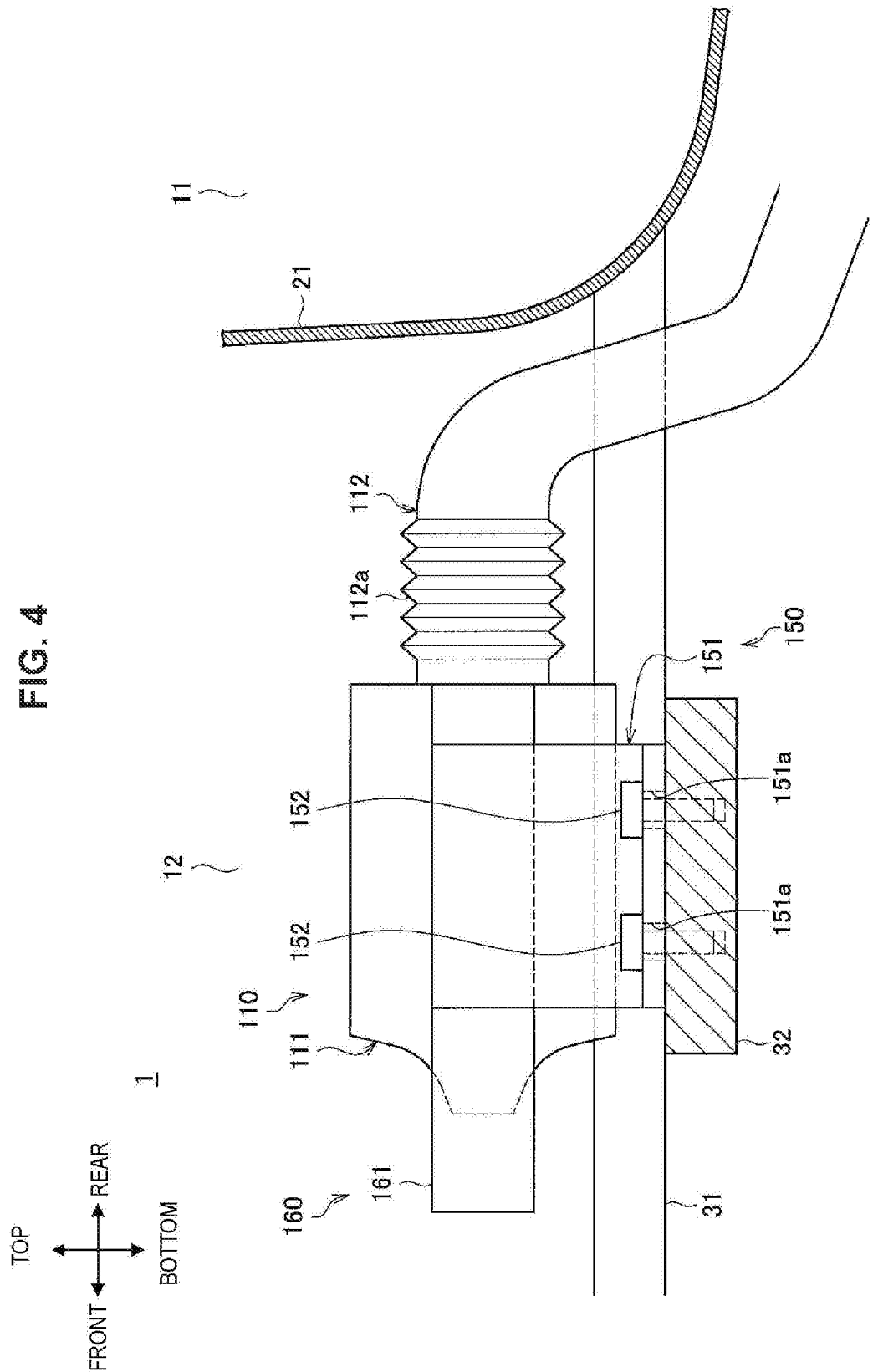
FIG. 4 is a schematic view from the left side of the turbine engine of the vehicle according to the first embodiment of the disclosure and members around the turbine engine.

FIG. 2 is a schematic plan view illustrating an overall configuration of the inside of the engine room 12 of the vehicle 1. FIG. 3 is a schematic view from the back side of the turbine engine 110 of the vehicle 1 and members around the turbine engine 110, and specifically, a sectional view of the section A-A of FIG. 2. FIG. 4 is a schematic view from the left side of the turbine engine 110 of the vehicle 1 and members around the turbine engine 110, and specifically, a sectional view of the section B-B of FIG. 2.

A pair of left and right front side members 31 and 31 and a front cross member 32 are provided in the engine room 12 as illustrated in FIG. 2 to FIG. 4. The front side members 31 and 31 and the front cross member 32 correspond to frame members on the front side of the vehicle 1. Further, the frame members of the vehicle 1 including the front side members 31 and 31 and the front cross member 32 are formed of an iron-based material, for example, stainless steel, or the like.

The front side members 31 and 31 extend in the front-rear direction of the vehicle on the left end and the right end inside the engine room 12, respectively. The front ends of the front side members 31 are coupled to the front bumper beam 22 via a crash box 23 which is an energy absorption member. Further, the rear ends of the front side member 31 are coupled to another frame member of the vehicle 1.

The front cross member 32 extends in the left-right direction of the vehicle and straddles the front side members 31 and 31. Specifically, the right end of the front cross member 32 is coupled to the right front side member 31, and the left end of the front cross member 32 is coupled to the left front side member 31.

The turbine engine 110 has a turbine engine body 111 and an exhaust pipe 112 coupled to the rear side of turbine engine body 111 in the front-rear direction of the vehicle. An air intake 111a is formed at an end on the front side of turbine engine body 111 in the front-rear direction of the vehicle, and a compressor 111b and a turbine 111c which are coupled by a rotating shaft 111d are provided inside the turbine engine body 111. The rotating shaft 111d extends in the front-rear direction of the vehicle, the compressor 111b is fixed to the front side of the rotating shaft 111d, and the turbine 111c is fixed to the rear side of the rotating shaft 111d.

In the turbine engine 110 described above, outside air is taken in from the air intake 111a and compressed by the compressor 111b. Then, the compressed air is mixed with fuel supplied from the fuel port, which is not illustrated, and burned. Then, the high temperature and high pressure gas produced from the combustion drives the turbine 111c to rotate and is sent to the exhaust pipe 112, and then discharged to the outside of the vehicle through the exhaust pipe 112.

In the first embodiment, a fragile part 112a that is crushed more easily than other parts of the exhaust pipe 112 is formed in the exhaust pipe 112 on the turbine engine body 111 in the turbine engine 110 as described above. The fragile part 112a has, for example, a bellows shape as illustrated in FIG. 2 and FIG. 4. Further, the fragile part 112a need only be crushed more easily than other parts of the exhaust pipe 112, and is not limited to having the bellows shape. For example, a mesh-like portion formed by alternately overlaying a plurality of elongated members may be applied as the fragile part 112a.

Specifically, the path of the exhaust pipe 112 extends rearward in the front-rear direction of the vehicle from the rear side of the turbine engine body 111 in the front-rear direction of the vehicle, then drops downward, and then extends toward the bottom of the toe board 21. The fragile part 112a is formed, specifically, at a part of the exhaust pipe 112 extending rearward in the front-rear direction of the vehicle from the rear side of the turbine engine body 111 in the front-rear direction of the vehicle as illustrated in FIG. 4.

Since the fragile part 112a is formed at the part of the exhaust pipe 112 extending in the front-rear direction of the vehicle as described above, it is crushed in the front-rear direction of the vehicle due to a collision load imposed at the time of a collision of the vehicle 1. It is preferable for the fragile part 112a to be crushed in the front-rear direction of the vehicle due to the collision load imposed at the time of the collision of the vehicle 1 in terms of effective absorption of the collision load.

Here, the turbine engine body 111 is located in front of the toe board 21. In addition, the fragile part 112a is formed at the part extending rearward from the rear side of the turbine engine body 111 in the front-rear direction of the vehicle as described above. For this reason, the fragile part 112a is located in front of the toe board 21. It is preferable for the fragile part 112a to be located in front of the toe board 21 in terms of properly preventing the exhaust pipe 112 from colliding with the toe board 21.

The vehicle 1 further includes a mounting mechanism 150 with which the turbine engine 110 is mounted on a frame member on the front side in the front-rear direction of the vehicle. The turbine engine 110 is mounted on the front cross member 32 which is a frame member on the front side of the vehicle 1 by, specifically, the mounting mechanism 150. As described above, in one first embodiment, the front cross member 32 may serve as "frame member" on which the turbine engine 110 is mounted.

The mounting mechanism 150 specifically has mounting members 151 and bolts 152 coupled to the turbine engine 110 as illustrated in FIG. 2 to FIG. 4.

The mounting members 151 have screw insertion holes 151a penetrating the mounting member in the top-bottom direction of the vehicle, and the mounting members 151 are fastened with the front cross member 32 by the bolts 152 inserted into the screw insertion holes 151a. The screw insertion holes 151a specifically have a substantially columnar shape.

Specifically, the mounting members 151 are provided on the left and right sides of the turbine engine body 111 of the turbine engine 110. Each of the mounting members 151 includes two plate parts orthogonal to each other and has a substantially L-shaped cross section. Each of the mounting members 151 is formed of an iron-based material, for example, stainless steel or the like. One plate part of each of the mounting members 151 is placed on the top surface of the front cross member 32, and the other plate part is coupled to the turbine engine body 111 of the turbine engine 110 via an extension member 161, which will be described below. The screw insertion holes 151a are formed on the plate part of each mounting member 151 placed on the top surface of the front cross member 32. For example, two screw insertion holes 151a are formed in each mounting member 151 side by side in the front-rear direction of the vehicle as illustrated in FIG. 2. Further, screw holes into which the bolts 152 are screwed are formed at the positions on the front cross member 32 corresponding to each of the screw insertion holes 151a.

In addition, the bolts 152 are inserted into each of the screw insertion holes 151a from above, and the tip sides of the bolts 152 are screwed into the front cross member 32. Accordingly, the mounting members 151 are fastened with the front cross member 32 and thereby the turbine engine 110 is mounted on the front cross member 32. Further, although the example in which the turbine engine 110 is mounted at the center of the front cross member 32 in the left-right direction of the vehicle is illustrated in FIG. 2 and FIG. 3, the turbine engine 110 may be mounted at a part other than the center of the front cross member 32 in the left-right direction of the vehicle.

The vehicle 1 further includes a protection mechanism 160 that prevents the turbine engine 110 from receiving a collision load imposed at the time of a collision of the vehicle 1. The protection mechanism 160 specifically has the extension members 161 coupled to the turbine engine 110 as illustrated in FIG. 2 to FIG. 4. The extension members 161 extend in the front-rear direction of the vehicle further forward than the front end of the turbine engine 110 in the front-rear direction of the vehicle.

Specifically, the extension members 161 are provided on the left and right sides of the turbine engine body 111 of the turbine engine 110. Each of the extension members 161 has a rod shape and is formed of an iron-based material, for example, stainless steel or the like. The extension members 161 are coupled to a left side part and a right side part of the turbine engine body 111 of the turbine engine 110 and extend further forward than the side of the front end of the turbine engine body 111 from the side of the rear end of the turbine engine body 111 in the front-rear direction of the vehicle. In addition, the extension members 161 have higher rigidity than frame members on the front side of the turbine engine 110.

The extension members 161 extend in the front-rear direction of the vehicle further forward than the front end of the turbine engine 110 in the front-rear direction of the vehicle as described above. Accordingly, when the further front parts of the front side members 31 and 31 than the turbine engine 110 are collapsed and crushed in the front-rear direction of the vehicle at the time of a collision of the vehicle 1, members such as the front bumper beams 22 moving relatively close to the turbine engine 110 can be brought in contact with the extension members 161 earlier than with the turbine engine 110. Therefore, the collision load can be received by the extension members 161, and thus it is possible to prevent the turbine engine 110 from receiving the collision load.

Figure 5:
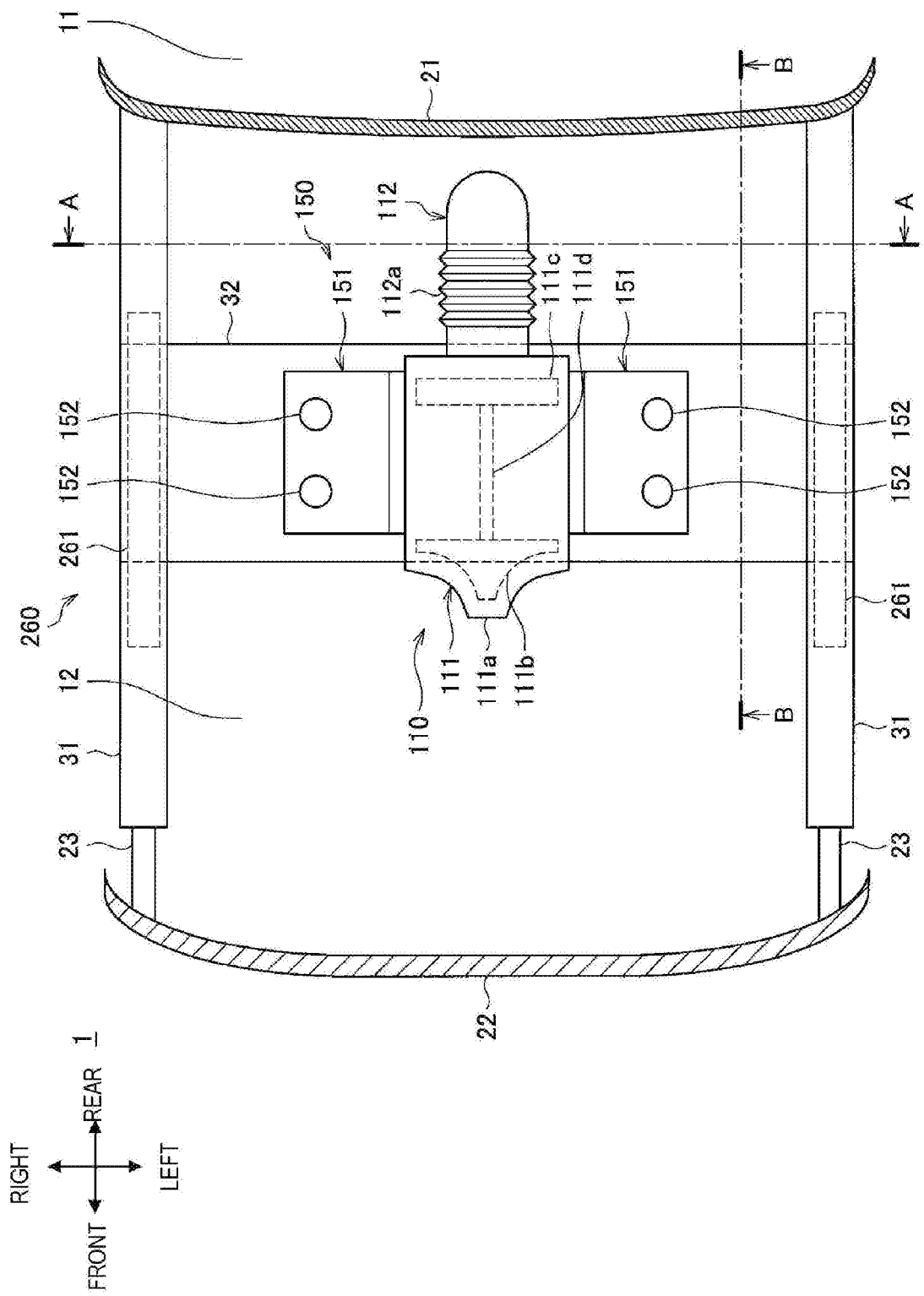
FIG. 5 is a schematic plan view illustrating an overall configuration of the inside of an engine room of a vehicle with a different protection mechanism from the first embodiment of FIG. 2 to FIG. 4.

Further, although the example in which the protection mechanism 160 with the extension members 161 is provided in the turbine engine 110 has been described above with reference to FIG. 2 to FIG. 4, the protection mechanism 160 is not limited thereto. FIG. 5 is a schematic plan view illustrating an overall configuration of the inside of the engine room 12 of the vehicle 1 with a different protection mechanism 260 from the example of FIG. 2 to FIG. 4.

The protection mechanism 260 specifically has reinforcement members 261 that reinforce a frame member on which the turbine engine 110 is mounted or other frame members coupled to the aforementioned frame member as illustrated in FIG. 5.

Specifically, the reinforcement members 261 reinforce the front side members 31 which are other frame members coupled to the front cross member 32 which is the frame member on which the turbine engine 110 is mounted. The reinforcement members 261 are provided in the left and right front side members 31 and 31. The front side members 31 specifically have a hollow cylindrical shape, and each of the reinforcement members 261 is formed to stick onto an inner or outer circumferential surface of the front side member 31 and extend in the front-rear direction of the vehicle. For example, each of the reinforcement members 261 is formed of an iron-based material or a metallic material such as an aluminum-based material. Further, a shape and a material of each reinforcement member 261 are not particularly limited.

In addition, each of the reinforcement members 261 specifically extends from a further rearward side than the rear end of the turbine engine body 111 of the turbine engine 110 to a further frontward side than the front end of the turbine engine body 111 in the front-rear direction of the vehicle. Accordingly, the parts of the front side members 31 and 31 from the position corresponding to the rear end of the turbine engine body 111 of the turbine engine 110 to the position corresponding to the front end of the turbine engine body 111 in the front-rear direction of the vehicle are reinforced.

The front side members 31 and 31 are reinforced by the reinforcement members 261 as described above. Specifically, the parts of the front side members 31 and 31 from the position corresponding to the rear end of the turbine engine body 111 of the turbine engine 110 to the position corresponding to the front end of the turbine engine body 111 in the front-rear direction of the vehicle are reinforced. Accordingly, it is possible to set the above-described parts of the front side members 31 and 31 reinforced by the reinforcement members 261 to receive a collision load at the time of a collision of the vehicle 1 while the above-described parts can be prevented from collapsing, and thus the turbine engine 110 can be prevented from receiving the collision load.

[Operation]

Next, an operation of the vehicle 1 according to the first embodiment will be described with reference to FIG. 6.

Figure 6:
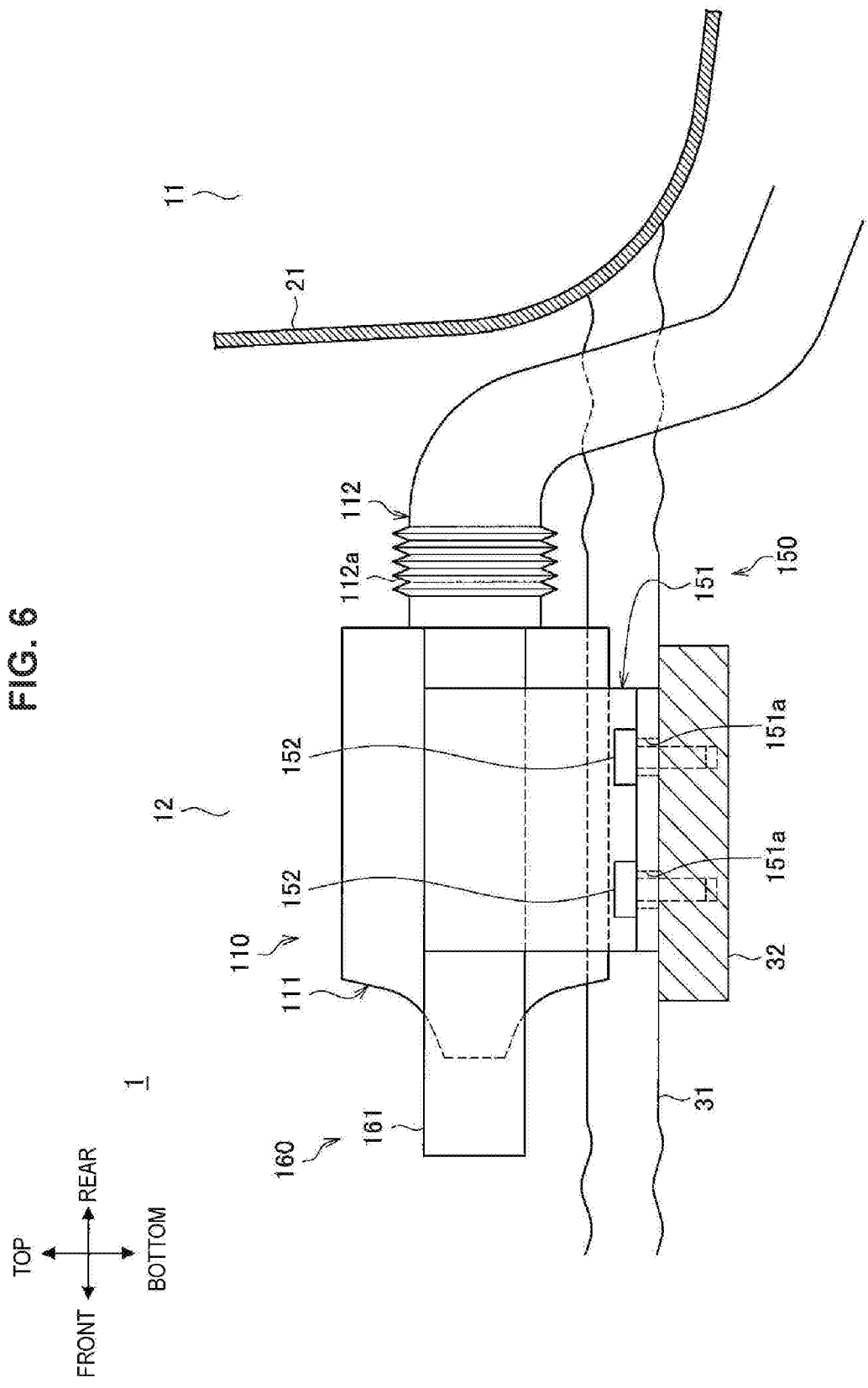
FIG. 6 is a schematic view illustrating the state of the turbine engine and the members around the turbine engine at the time of a collision of the vehicle according to the first embodiment of the disclosure.

FIG. 6 is a schematic view illustrating the state of the turbine engine 110 and the members around the turbine engine 110 at the time of a collision of the vehicle 1 according to the first embodiment of the disclosure. Further, FIG. 6 illustrates an example in which the protection mechanism 160 is provided as a protection mechanism.

At the time of a collision of the vehicle 1 (specifically, when a front part of the vehicle 1 collides with an obstacle ahead of the vehicle 1), members having the function of absorbing a collision load such as the crash box 23 and the front side members 31 and 31 receive the collision load, and each of the members is crashed and crushed in the front-rear direction of the vehicle. FIG. 6 illustrates, for example, the right front side member 31 that has been crashed.

Here, there are vehicles with turbine engines taking measures for preventing the turbine engines being damaged as described above. For example, the protection mechanism 160 is provided in the vehicle 1 as one of such measured. Due to the measure, for example, the connection part of the front cross member 32 with the front side members 31 and 31 is less likely to be crushed in the front-rear direction of the vehicle.

On the other hand, in the first embodiment, the fragile part 112*a* that is crushed more easily than other parts of the exhaust pipe 112 is formed in the exhaust pipe 112 on the turbine engine body 111 side as described above. Therefore, the fragile part 112*a* can be set to be crushed due to a collision load when the turbine engine body 111 moves rearward at the time of a collision of the vehicle 1, while it is possible to prevent the exhaust pipe 112 from moving rearward toward the toe board 21. FIG. 6 illustrates, for example, the state in which rearward movement of the exhaust pipe 112 is suppressed while the turbine engine body 111 has been moved further rearward than in FIG. 4.

According to the first embodiment, the fragile part 112*a* can be set to be crushed due to the collision load while the rearward movement of the exhaust pipe 112 toward the toe board 21 is suppressed at the time of the collision of the vehicle 1 as described above. Accordingly, the fragile part 112*a* can be caused to absorb the collision load while a collision of the exhaust pipe 112 with the toe board 21 and an intrusion thereof into the cabin 11 are prevented.

[Effects]

Next, effects of the vehicle 1 according to the first embodiment will be described.

In the vehicle 1 according to the first embodiment, the turbine engine 110 is mounted on the front cross member 32 serving as a front frame member of the vehicle 1. In addition, the fragile part 112*a* that is crushed more easily than other parts of the exhaust pipe 112 is formed in the exhaust pipe 112 of the turbine engine 110 on the turbine engine body 111 side. Accordingly, at the time of a collision of the vehicle 1, the fragile part 112*a* can be set to be crushed due to the collision load while rearward movement of the exhaust pipe 112 toward the toe board 21 is suppressed. Therefore, the fragile part 112*a* can be caused to absorb the collision load while the exhaust pipe 112 is prevented from colliding with the toe board 21 and intruding into the cabin 11. Thus, the collision load imposed at the time of the collision of the vehicle 1 can be properly absorbed. Therefore, the measure for preventing the turbine engine 110 from being damaged can be taken while securing the absorption amount of the collision load, and thus, safety can be properly secured.

In addition, in the vehicle 1 according to first embodiment, it is preferable to position the fragile part 112*a* in front of the toe board 21 defining the cabin 11. Accordingly, when the turbine engine body 111 moves rearward at the time of a collision of the vehicle 1, it is possible to more properly suppress rearward movement of the exhaust pipe 112 toward the toe board 21. Therefore, the collision of the exhaust pipe 112 with the toe board 21 and the intrusion into the cabin 11 can be properly prevented.

In addition, in the vehicle 1 according to first embodiment, it is preferable for the fragile part 112a to be crushed in the front-rear direction of the vehicle due to the collision load at the time of the collision of the vehicle 1. Accordingly, the fragile part 112a can be set to be crushed in the direction along the direction of the collision load. Therefore, the collision load can be absorbed more effectively.

In addition, it is preferable for the vehicle 1 according to the first embodiment to include the protection mechanism 160 or 260 that prevents the turbine engine 110 from receiving a collide load imposed at the time of a collision of the vehicle 1. Accordingly, it is possible to properly make it difficult for the turbine engine 110 to be crushed in the front-rear direction of the vehicle, and thus the turbine engine 110 can be properly prevented from being damaged.

In addition, it is preferable for the protection mechanism of the vehicle 1 according to the first embodiment to have the extension members 161 coupled to the turbine engine 110 extending further forward in the front-rear direction of the vehicle than the front end of the turbine engine 110 in the front-rear direction of the vehicle. Accordingly, it is possible to properly make it difficult for the turbine engine 110 to be crushed in the front-rear direction of the vehicle, and thus the turbine engine 110 can be properly prevented from being damaged.

In addition, it is preferable for the protection mechanism of the vehicle 1 according to the first embodiment to have the reinforcement members 261 that reinforce the frame member on which the turbine engine 110 is mounted (for example, the front cross member 32) or other frame members coupled to the aforementioned frame member (for example, the front side member 31). Accordingly, it is possible to properly make it difficult for the turbine engine 110 to be crushed in the front-rear direction of the vehicle, and thus the turbine engine 110 can be properly prevented from being damaged.

2. Second Embodiment

A vehicle 2 according to a second embodiment of the disclosure will be described with reference to FIG. 7 to FIG. 9.

[Configuration]

First, a configuration of the vehicle 2 according to the second embodiment will be described with reference to FIG. 7 and FIG. 8.

The vehicle 2 according to the second embodiment has a difference in the configuration of the mounting mechanism from the vehicle 1 described above. Therefore, description of constituent components other than the mounting mechanism of the vehicle 2 will be omitted.

Figure 7:
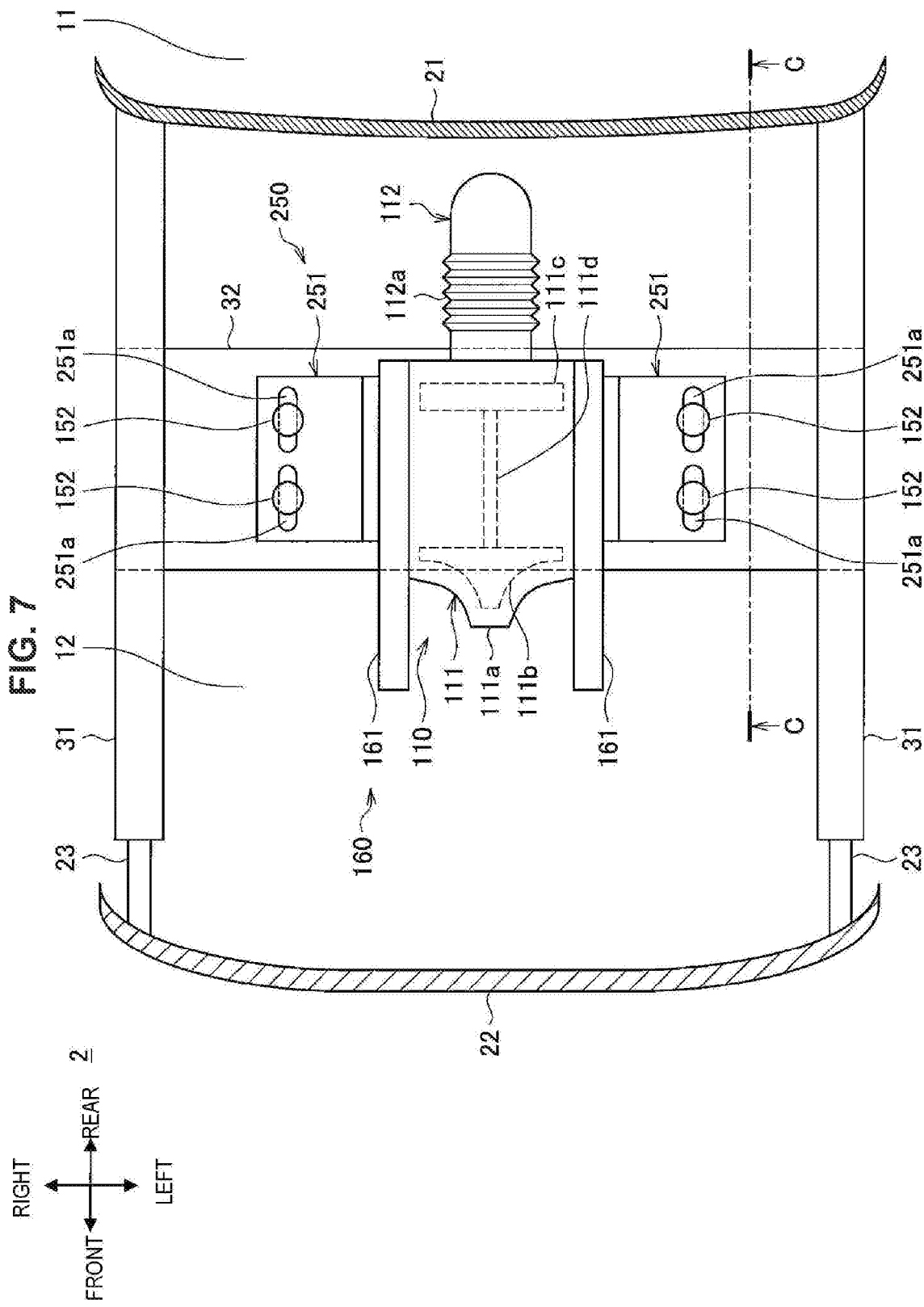
FIG. 7 is a schematic plan view illustrating an overall configuration of the inside of the engine room of a vehicle according to a second embodiment of the disclosure.

FIG. 7 is a schematic plan view illustrating an overall configuration of the inside of an engine room 12 of the vehicle 2. FIG. 8 is a schematic view from the left side of a turbine engine 110 of the vehicle 2 and members around the turbine engine 110, and specifically, a sectional view taken along the C-C section of FIG. 7. Further, FIG. 7 and FIG. 8 illustrate an example in which a protection mechanism 160 is provided as a protection mechanism.

Figure 8:
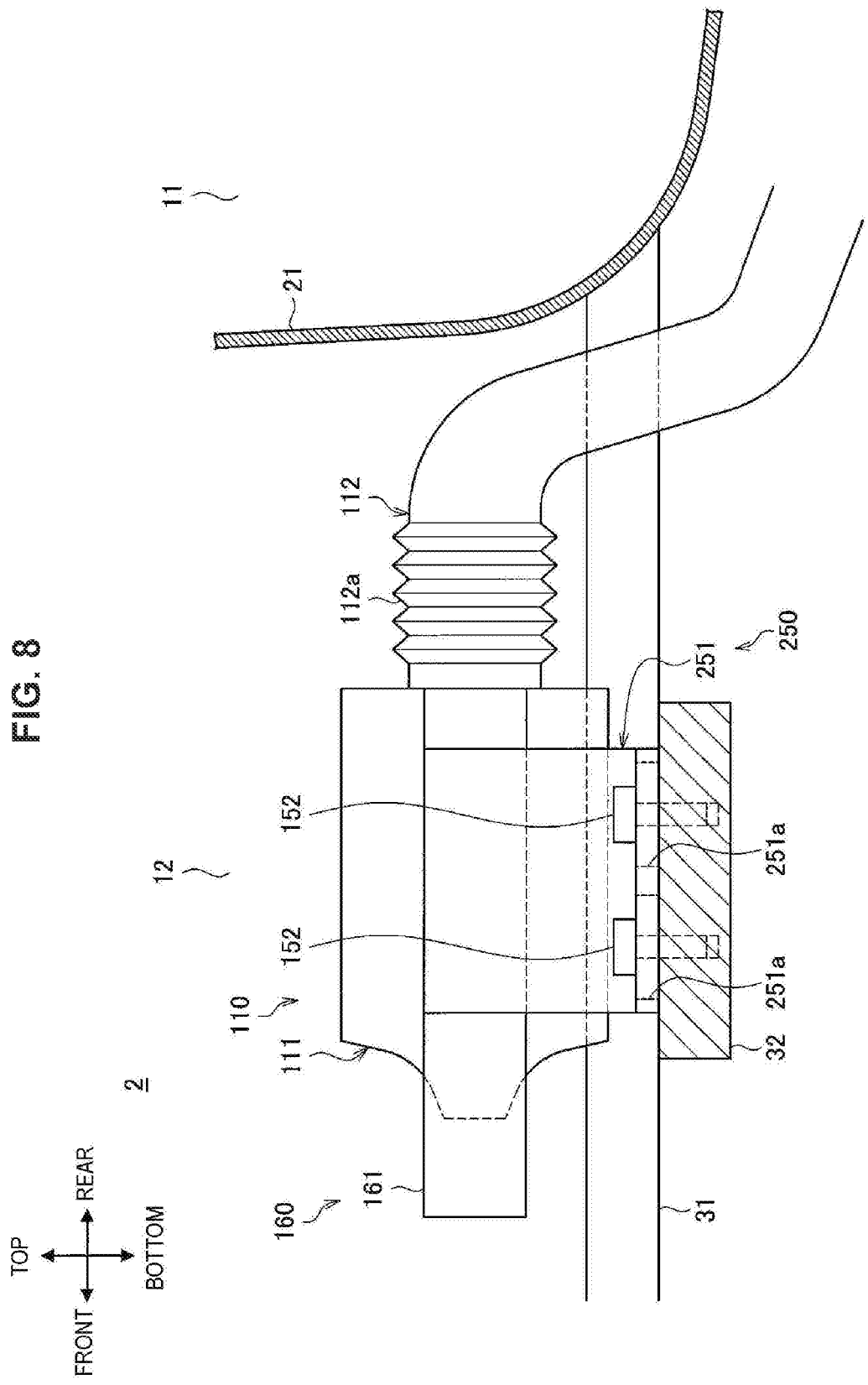
FIG. 8 is a schematic view from the left side of the turbine engine of the vehicle according to the second embodiment of the disclosure and members around the turbine engine.

The vehicle 2 includes a mounting mechanism 250 by which the turbine engine 110 is mounted on a frame member at the front side thereof in the front-rear direction of the vehicle, similarly to the vehicle 1 as illustrated in FIG. 7 and FIG. 8.

Here, the mounting mechanism 250 according to the second embodiment allows the turbine engine 110 to be mounted on the frame member at the front side in the front-rear direction of the vehicle in a state in which the turbine engine 110 can be moved with respect to the frame member in the front-rear direction of the vehicle at the time of a collision of the vehicle 2, unlike the mounting mechanism 150 described above. Further, the turbine engine 110 is specifically mounted on a front cross member 32 which is the frame member at the front side of the vehicle 1 by the mounting mechanism 250, similarly to the vehicle 1.

The mounting mechanism 250 specifically has mounting members 251 that are coupled to the turbine engine 110 and bolts 152 as illustrated in FIG. 7 and FIG. 8.

The mounting members 251 are fastened with the front cross member 32 by the bolts 152 that penetrate the mounting members 251 in the top-bottom direction of the vehicle and are inserted into screw insertion holes 251a formed in the mounting members 251, similarly to the mounting members 151 of the mounting mechanism 150 described above.

Here, the screw insertion holes 251a are formed in the mounting members 251 of the mounting mechanism 250 extending in the front-rear direction of the vehicle, unlike the mounting members 151 of the mounting mechanism 150 described above. Specifically, the lengths of the screw insertion holes 251a in the front-rear direction of the vehicle are longer than the lengths thereof in the left-right direction of the vehicle. Further, since shapes of parts of the mounting members 251 other than the screw insertion holes 251a and positional relationship between the parts and surrounding members are similar to those of the mounting members 151 of the mounting mechanism 150 described above, description thereof will be appropriately omitted.

Screw holes into which the bolts 152 are screwed are formed at positions on the front cross member 32 corresponding to each of the screw insertion holes 251a, and the bolts 152 are inserted into each of the screw insertion holes 251a from above and tips of the bolts 152 are screwed into the front cross member 32. Accordingly, the mounting members 251 are fastened with the front cross member 32 and thus the turbine engine 110 is mounted on the front cross member 32.

At the time of a collision of the vehicle 1, a collision load is imposed on the parts at which the mounting members 251 are fastened with the front cross member 32, resulting in loosening the bolts 152 or the like, for example, and thus the fastening of the mounting members 251 with the front cross member 32 is released. Here, since the screw insertion holes 251a into which the bolts 152 are inserted are formed to extend in the front-rear direction of the vehicle as described above, the mounting members 251 can be moved with respect to the front cross member 32 in the front-rear direction of the vehicle. Accordingly, the turbine engine 110 can be moved with respect to the front cross member 32 in the front-rear direction of the vehicle.

In addition, when the fastening of the mounting members 251 with the front cross member 32 is released as described above, movement of the turbine engine 110 with respect to the front cross member 32 in the top-bottom direction of the vehicle is regulated by the heads of the bolts 152. In addition, movement of the turbine engine 110 with respect to the front cross member 32 in the left-right direction of the vehicle is regulated by the bolts 152 because the bolts 152 abut against the inner side surfaces on both sides of the screw insertion holes 251a in the left-right direction of the vehicle. It is preferable for the mounting mechanism 250 to regulate movement of the turbine engine 110 with respect to the front cross member 32 in the top-bottom direction of the vehicle and left-right direction of the vehicle as described above, in terms of the mounting mechanism 250 preventing the turbine engine 110 from colliding with other members and being damaged.

[Operation]

Next, an operation of the vehicle 2 according to the second embodiment will be described with reference to FIG. 9.

Figure 9:
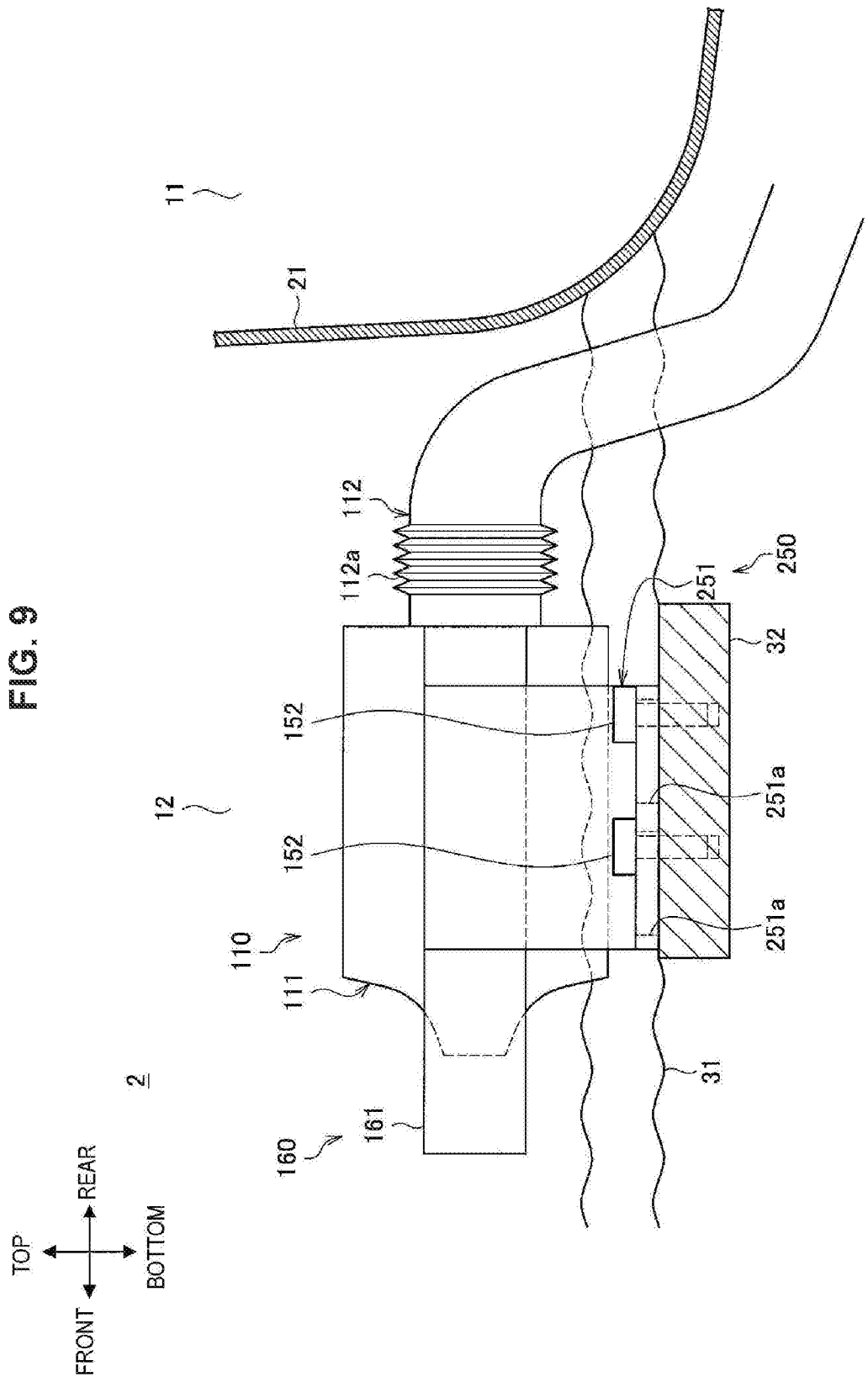
FIG. 9 is a schematic view illustrating the state of the turbine engine and the members around the turbine engine at the time of a collision of the vehicle according to the second embodiment of the disclosure.

FIG. 9 is a schematic view illustrating the state of the turbine engine 110 and the members around the turbine engine 110 at the time of a collision of the vehicle 2. Further, FIG. 9 illustrates an example in which the protection mechanism 160 is provided as a protection mechanism.

At the time of the collision of the vehicle 2 (specifically, when a front part of the vehicle 2 collides with an obstacle ahead of the vehicle 2), members having the function of absorbing a collision load such as a crash box 23 and front side members 31 and 31 receive the collision load, and each of the members is crashed and crushed in the front-rear direction of the vehicle as described above. FIG. 9 illustrates, for example, the right front side member 31 that has been crashed, as in FIG. 6.

In the second embodiment, the turbine engine 110 is mounted on the front cross member 32 by the mounting mechanism 250 in the state in which the turbine engine 110 can be moved with respect to the front cross member 32 in the front-rear direction of the vehicle at the time of the collision of the vehicle 2 as described above. Accordingly, the turbine engine 110 can be moved with respect to the front cross member 32 in the front-rear direction of the vehicle at the time of the collision of the vehicle 2. Specifically, the fastening of the mounting members 251 with the front cross member 32 is released since the collision load is imposed on the parts at which the mounting members 251 are fastened with the front cross member 32, and thus the turbine engine 110 can be moved with respect to the front cross member 32 in the front-rear direction of the vehicle as described above. For example, FIG. 9 illustrates the state of the turbine engine 110 that has been moved with respect to the front cross member 32 in the front-rear direction of the vehicle.

According to the second embodiment, the turbine engine 110 can be moved with respect to the front cross member 32 in the front-rear direction of the vehicle at the time of the collision of the vehicle 2 as described above. Accordingly, the front side members 31 and 31 can be crushed in the front-rear direction of the vehicle more easily than when the turbine engine 110 is fixed to the front cross member 32. Specifically, the connection parts of the front side members 31 and 31 with the front cross member 32 can be crushed easily in the front-rear direction of the vehicle. Therefore, since a wide range including the connection parts of the front side members 31 and 31 with the front cross member 32 can be properly crashed at the time of the collision of the vehicle 2, the crash stroke of the front side members 31 and 31 can be increased.

[Effect]

Next, effects of the vehicle 2 according to the second embodiment will be described.

The vehicle 2 according to the second embodiment includes the mounting mechanism 250 that helps the turbine engine 110 mounted on the front cross member 32 in the state in which the turbine engine 110 can be moved with respect to the front cross member 32 in the front-rear direction of the vehicle at the time of a collision of the vehicle 2. Accordingly, at the time of the collision of the vehicle 2, the turbine engine 110 can be moved with respect to the front cross member 32 in the front-rear direction of the vehicle. Therefore, the front side members 31 and 31 serving as frame members having the function of absorbing the collision load can be crushed in the front-rear direction of the vehicle more easily than when the turbine engine 110 is fixed to the front cross member 32, and thus the crash stroke of the front side members 31 and 31 can be increased. Thus, the collision load imposed at the time of the collision of the vehicle 2 can be more properly absorbed.

In addition, it is preferable for the mounting mechanism 250 of the vehicle 2 according to the second embodiment to regulate movement of the turbine engine 110 with respect to the front cross member 32 in the top-bottom direction of the vehicle and left-right direction of the vehicle at the time of a collision of the vehicle 2. Accordingly, at the time of the collision of the vehicle 2, the turbine engine 110 can be prevented from colliding with other members disposed around the turbine engine 110 and being damaged. Specifically, since the turbine engine 110 is prevented from colliding with other members, the turbine 111c rotating inside the turbine engine body 111 of the turbine engine 110 at a high speed can be prevented from being brought in contact with an inner wall of the housing of the turbine engine body 111, and thus the turbine engine 110 can be prevented from being damaged.

In addition, it is preferable for the mounting mechanism 250 of the vehicle 2 according to the second embodiment to have the mounting members 251 coupled to the turbine engine 110, for the mounting members 251 to have the screw insertion holes 251a formed to penetrate the mounting members in the top-bottom direction of the vehicle and extend in the front-rear direction of the vehicle, and for the mounting members 251 to be fastened with the front cross member 32 by the bolts 152 inserted into the screw insertion holes 251a. Accordingly, at the time of the collision of the vehicle 2, the turbine engine 110 can be properly moved with respect to the front cross member 32 in the front-rear direction of the vehicle. Furthermore, at the time of the collision of the vehicle 2, movement of the turbine engine 110 with respect to the front cross member 32 in the top-bottom direction of the vehicle and left-right direction of the vehicle can be properly regulated.

3. Conclusion

In the vehicles 1 and 2 according to each of the embodiments of the disclosure, the turbine engine 110 is mounted on the front cross member 32 serving as a frame member on the front side of the vehicles 1 and 2 as described above. In addition, the fragile part 112a that is crushed more easily than other parts of the exhaust pipe 112 is formed in the exhaust pipe 112 on the turbine engine body 111 side of the turbine engine 110. Accordingly, while rearward movement of the exhaust pipe 112 toward the toe board 21 is suppressed, the fragile part 112a can be crushed by a collision load imposed at the time of a collision of the vehicles 1 and 2. Therefore, while the collision of the exhaust pipe 112 with the toe board 21 and an intrusion into the cabin 11 are suppressed, the collision load can be absorbed by the fragile part 112a. Thus, the collision load imposed at the time of the collision of the vehicles 1 and 2 can be properly absorbed. Therefore, since the measure for preventing the turbine engine 110 from being damaged can be taken while the amount of absorbing the collision load is secured, proper safety can be secured.

Although the preferred embodiments of the disclosure have been described in detail with reference to the appended drawings, the disclosure is not limited thereto. It is obvious to those skilled in the art that various modifications or variations are possible insofar as they are within the technical scope of the appended claims or the equivalents thereof. It should be understood that such modifications or variations are also within the technical scope of the disclosure.

Although the system for travel of the vehicle 1 has been described above with reference to FIG. 1, for example, a system for travel of a vehicle according to an embodiment of the disclosure is not limited thereto. A vehicle according to an embodiment of the disclosure may be, for example, a vehicle that can travel using the turbine engine 110 as a drive source. In addition, multiple drive motors 140, for example, may be provided in a vehicle according to an embodiment of the disclosure.

In addition, although the frame members inside the engine room 12 of the vehicle 1 have been described above with reference to FIG. 2 to FIG. 4, for example, the number, sizes, shapes, and disposition of frame members in the engine room of a vehicle according to an embodiment of the disclosure are not limited to thereto. A member other than the members described above may be added into the engine room of the vehicle according to the embodiments of the disclosure, for example, as a frame member in the engine room.

In addition, although the configurations of the mounting mechanisms 150 and 250 have been described above with reference to FIG. 2 to FIG. 4 and FIG. 7 and FIG. 8, for example, a configuration of a mounting mechanism provided in a vehicle according to an embodiment of the disclosure is not limited thereto.

Specifically, a mounting mechanism provided in a vehicle according to an embodiment of the disclosure may have the number, a size, a shape, or disposition of mounting members changed from those of the mounting mechanisms 150 and 250. For example, the mounting member may be a plate-like member extending from the left side to the right side of the turbine engine 110 between the turbine engine 110 and the front cross member 32. In this case, screw insertion holes can be formed at parts of the mounting member stretching to the left and right sides of the turbine engine 110. In addition, the number, a size, a shape, and disposition of screw insertion holes formed in the mounting member are not limited to the above example. For example, the length of the screw insertion holes in the front-rear direction of the vehicle may be long enough for inserting two or more bolts into the screw insertion holes.

In addition, although the mounting mechanism 250 that uses fastening with the bolts has been described as a mounting mechanism that enables the turbine engine 110 to move in the front-rear direction of the vehicle with respect to the frame member on the front side in the front-rear direction of the vehicle at the time of a collision of the vehicle, the function may be fulfilled by a different mechanism from the mechanism that uses fastening with the bolts. A mounting mechanism provided in a vehicle according to an embodiment of the disclosure, may have, for example, a mechanism with a relatively fragile member such as an adhesive or a resin bush that connects the turbine engine 110 to the front cross member 32 (specifically, a member that is fragile enough to be fractured due to a collision load imposed as the time of a collision of the vehicle) and a guide part that guides the turbine engine 110 in the front-rear direction of the vehicle. In this case, since the relatively fragile member is fractured due to the collision load at the time of the collision of the vehicle, the turbine engine 110 can be moved with respect to the front cross member 32 in the front-rear direction of the vehicle.

In addition, although the extension members 161 of the protection mechanism 160 have been described above with reference to FIG. 2 to FIG. 4, for example, the number, a size, a shape, and disposition of extension members provided in the vehicle according to an embodiment of the disclosure are not limited thereto. The extension members provided in the vehicle according to an embodiment of the disclosure may be provided, for example, below the turbine engine body 111 of the turbine engine 110. In addition, for example, like the mounting members 151 formed integrally with the extension members 161 using the same material described with reference to FIG. 2 to FIG. 4, a mounting member provided in a vehicle according to an embodiment of the disclosure may serve as an extension member.

In addition, although the fragile part 112a formed in the exhaust pipe 112 has been described above with reference to FIG. 2 to FIG. 4, for example, a configuration of a fragile part formed in an exhaust pipe of a turbine engine provided in a vehicle according to an embodiment of the disclosure is not limited thereto. For example, the fragile part may be formed by making the material or thickness of the exhaust pipe on the turbine engine body of the turbine engine according to an embodiment of the disclosure different from that of other parts.

What is claimed is:

1. A vehicle comprising:
   a turbine engine,
   wherein the turbine engine is mounted on a frame member on a front side of the vehicle and has a turbine engine body and an exhaust pipe coupled to a rear side of the turbine engine body in a front-rear direction of the vehicle, and
   wherein a fragile part configured to be crushed more easily than another part of the exhaust pipe is formed in the exhaust pipe on a turbine engine body side.

2. The vehicle according to claim 1,
   wherein the fragile part is positioned in front of a toe board defining a cabin.

3. The vehicle according to claim 1,
   wherein the fragile part is configured to be crushed in the front-rear direction of the vehicle due to a collision load at the time of a collision of the vehicle.

4. The vehicle according to claim 2,
   wherein the fragile part is configured to be crushed in the front-rear direction of the vehicle due to a collision load at the time of a collision of the vehicle.

5. The vehicle according to claim 1,
   wherein the fragile part has a bellows shape.

6. The vehicle according to claim 2,
   wherein the fragile part has a bellows shape.

7. The vehicle according to claim 1, further comprising:
   a protection mechanism configured to prevent the turbine engine from receiving the collision load at the time of the collision of the vehicle.

8. The vehicle according to claim 2, further comprising:
   a protection mechanism configured to prevent the turbine engine from receiving the collision load at the time of the collision of the vehicle.

9. The vehicle according to claim 7,
wherein the protection mechanism comprises an extension member coupled to the turbine engine and extending in a front-rear direction of the vehicle further forward than a front end of the turbine engine in the front-rear direction of the vehicle.

10. The vehicle according to claim 8,
wherein the protection mechanism comprises an extension member coupled to the turbine engine and extending in a front-rear direction of the vehicle further forward than a front end of the turbine engine in the front-rear direction of the vehicle.

11. The vehicle according to claim 7,
wherein the protection mechanism comprises a reinforcement member that reinforces the frame member or another frame member coupled to the frame member.

12. The vehicle according to claim 9,
wherein the protection mechanism comprises a reinforcement member that reinforces the frame member or another frame member coupled to the frame member.

13. The vehicle according to claim 1, further comprising:
a mounting mechanism by which the turbine engine is mounted on the frame member such a manner that the turbine engine can be moved with respect to the frame member in the front-rear direction of the vehicle at the time of a collision of the vehicle.

14. The vehicle according to claim 2, further comprising:
a mounting mechanism by which the turbine engine is mounted on the frame member such a manner that the turbine engine can be moved with respect to the frame member in the front-rear direction of the vehicle at the time of the collision of the vehicle.

15. The vehicle according to claim 13,
wherein the mounting mechanism is configured to regulate movement of the turbine engine with respect to the frame member in a vertical direction of the vehicle and a left-right direction of the vehicle at the time of the collision of the vehicle.

16. The vehicle according to claim 14,
wherein the mounting mechanism is configured to regulate movement of the turbine engine with respect to the frame member in a vertical direction of the vehicle and a left-right direction of the vehicle at the time of the collision of the vehicle.

17. The vehicle according to claim 13,
wherein the mounting mechanism comprises a mounting member coupled to the turbine engine,
wherein a screw insertion hole is formed in the mounting member in such a manner that the screw insertion hole penetrates the mounting member in a vertical direction of the in a vertical direction of the vehicle, and
wherein the mounting member is fastened with the frame member by a bolt inserted into the screw insertion hole.

18. The vehicle according to claim 15,
wherein the mounting mechanism comprises a mounting member coupled to the turbine engine,
wherein a screw insertion hole is formed in the mounting member in such a manner that the screw insertion hole penetrates the mounting member in a vertical direction of the vehicle, and
wherein the mounting member is fastened with the frame member by a bolt inserted into the screw insertion hole.

* * * * *